Patented Sept. 10, 1929.

1,728,156

UNITED STATES PATENT OFFICE.

RAYMOND C. WHEELER AND PAUL W. PRUTZMAN, OF LOS ANGELES, CALIFORNIA.

REGENERATION OF ALKALINE PURIFYING BEDS.

No Drawing. Application filed June 24, 1927. Serial No. 201,258.

Our invention refers to the continuous regeneration of beds or packs of solid alkalis used to purify petroleum vapors passed therethrough. It refers to preventing the accumulation in such packs of materials, withdrawn from the vapors, which destroy the purifying action of such packs. It refers also to the regeneration of such packs after their effectiveness has been destroyed by accumulation of materials withdrawn from the vapors.

Our invention refers to any process in which vapors containing bodies reactive with alkali are passed through permeable beds of water-soluble alkalis, as for instance the carbonates or hydrates of sodium or potassium. It refers more particularly to the process disclosed and claimed by Raymond C. Wheeler in his application entitled Vapor phase treatment of petroleum, filed May 11, 1927, Serial No. 190,557.

As disclosed in the said application, when petroleum vapors containing phenols and naphthenic acids are passed, at substantially their boiling point, through permeable beds formed of grains or flakes of solid alkali, these bodies (and perhaps others) combine with the alkali, forming soaps and salts. These reaction products are usually of a pasty consistency and form in thin skins on the surfaces of the grains or flakes of alkali of which the bed is composed.

Under favorable conditions (as where vapor velocity through the pack is high) these reaction products detach themselves from the surfaces on which they are formed, coalesce into drops or streamlets which percolate slowly downward through the bed and finally drip into the bottom of the reaction chamber in which the bed is placed.

Under other conditions (as where a preferred low vapor velocity through the bed is maintained) these products are not detached from the alkali surfaces, but remain to form a coating impervious to further access of vapor to the alkali. The bed then ceases to function as a purifying means, often when most of the alkali still remains uncombined and reactive.

We have discovered that by intermixing with the oil vapors, prior to their entry into the pack, a minute quantity of water vapor, the soapy reaction product may be detached as fast as it is formed and the alkali thus maintained in an actually active condition until it is consumed.

The said reaction products are readily soluble in water but it is not believed that they are able to withdraw and condense water from the mixture of vapors, particularly if the temperature of this mixture be high. But the alkalis named, and particularly the hydrates, are extremely hygroscopic, and will so withdraw and condense water even from vapors at a high temperature. The water so condensed dissolves continuously a minutely thin layer from the surface of each particle, and thus provides a fluid layer which prevents the engagement of the soap to the alkali grain. The soap as formed is thus kept in motion and, together with the dissolved alkali, percolates down through the pack and may be withdrawn from the bottom of the vessel. The alkali surfaces are thus kept clean and bright, and in a condition of maximum avidity for the reactive constituents of the vapors.

As the object of steam admission is solely to prevent adherence of the soap to the alkali the smallest possible quantity of steam should be used, any excess over this quantity wastefully dissolving the alkali. This minimum amount may be quickly determined, in any specific case, by starting with a quantity which will cause a free flow of alkaline solution from the bottom of the reaction chamber, and progressively reducing the steam feed until the outflow consists largely of soaps accompanied by a relatively small amount of solution. The two are immiscible and the proportion of each may thus readily be observed.

As a specific example and without limiting ourselves to the figures given we state that a quantity of water ranging from one-tenth percent to one percent of the volume of oil distilled will usually, when converted into steam, supply a sufficient proportion of steam for our purpose. It will be understood that the optimum proportion of steam to vapor will vary with the proportion of reactive bodies in the oil and to some extent also with the temperature of the vapors. In practice it is not desirable to use an arbitrary proportion of steam to vapor, a ready and dependable method for determining the optimum proportion being given in the paragraph above. It will also be understood that any small proportion of water contained in the oil being distilled will, being converted into steam during the distillation of the oil, be available for our purpose, and must be taken into consideration in any calculation which reduces steam supply to definite figures.

It will be understod that the quantity of steam required in this process is much smaller than that which would normally accompany the vapors of oil being distilled with steam alone or with fire and bottom steam. This method applies to the treatment of oil vapors substantially free from steam except for the small and controlled quantity admitted for this specific purpose This quantity could, of course, be admitted into the vapor generator or still, but the quantity permissible with regard to avoiding wastage of alkali would be too small to materially assist distillation.

The drip from the reaction chamber will separate into an upper layer of soaps and a lower layer of alkali, which layers may be mechanically parted after standing. The soaps are of value and may be disposed of or utilized in any usual or preferred manner. The layer of strong alkali solution will be substantially free from soaps and may be utilized for other purposes, or it may be dehydrated, crushed and fed back into the alkali bed, its usefulness being unimpaired.

If for any cause (as for instance, a failure to continuously feed a sufficient amount of steam) the alkali pack should become coated with soap and thus cease to function, the coating may be removed by admitting temporarily a relatively large supply of steam. As soon as the brown, soapy material thus disengaged ceases to flow freely from the reaction chamber, the steam supply should be cut back to the usual operating feed.

We claim as our invention:

1. The method of maintaining the effectiveness of packs of solid sodium hydrate used for the treatment of petroleum vapors which consists in passing through the pack in admixture with the oil vapors a quantity of steam sufficient only to disengae reaction products formed on the constituent particles of such pack, and continuously draining from said pack the products so disengaged.

2. The method of maintaining the reactivity of permeable beds of solid sodium hydrate used for the treatment of petroleum vapors which consists in passing through said beds, in admixture with the oil vapors, a quantity of steam sufficient only to render fluent the products of reaction between the alkali and constituents of the vapors, and continuously draining said fluent products from said beds.

In witness that we claim the foregoing we have hereunto subscribed our names this 16th day of June, 1927.

RAYMOND C. WHEELER.
PAUL W. PRUTZMAN.